Dec. 27, 1966  A. G. BOSE  3,294,981
SIGNAL TRANSLATION EMPLOYING TWO-STATE TECHNIQUES
Filed July 19, 1963  6 Sheets-Sheet 1

INVENTOR.
AMAR G. BOSE
BY
*Ezekiel Wolf, Wolf + Greenfield*
ATTORNEYS

Dec. 27, 1966 A. G. BOSE 3,294,981
SIGNAL TRANSLATION EMPLOYING TWO-STATE TECHNIQUES
Filed July 19, 1963 6 Sheets-Sheet 4
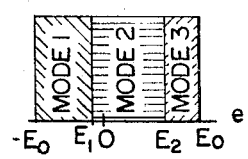
FIG. 10A
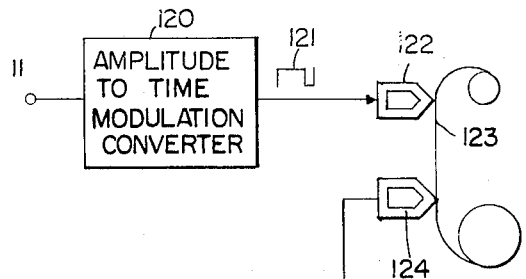
FIG. 13
FIG. 10B
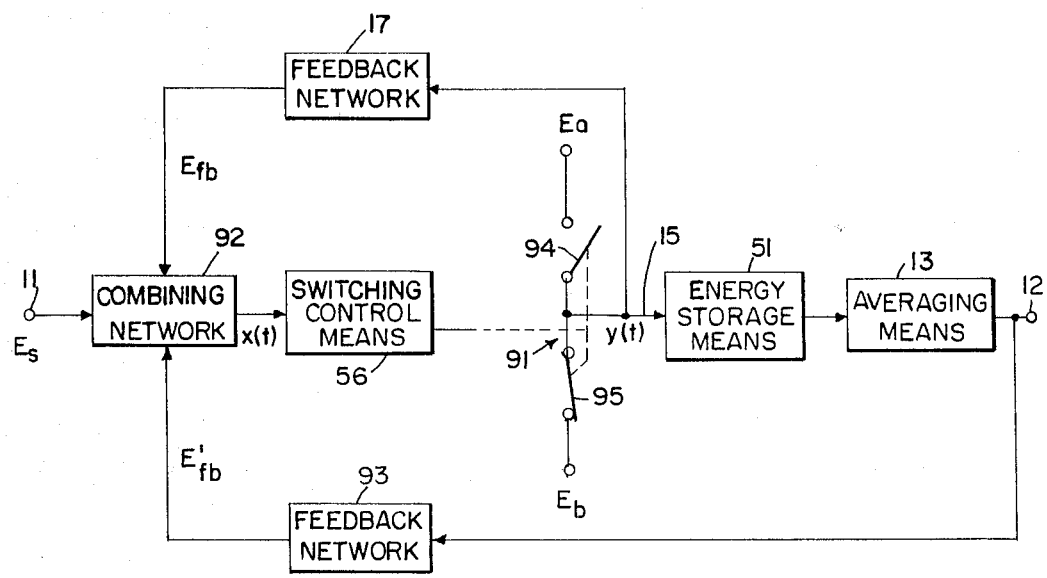
FIG. 11
INVENTOR.
AMAR G. BOSE
BY
Ezekiel Wolf, Wolf + Greenfield
ATTORNEYS Dec. 27, 1966  A. G. BOSE  3,294,981
SIGNAL TRANSLATION EMPLOYING TWO-STATE TECHNIQUES
Filed July 19, 1963  6 Sheets-Sheet 6

INVENTOR.
AMAR G. BOSE
BY
Ezekiel Wolf, Wolf + Greenfield
ATTORNEYS

United States Patent Office 3,294,981
Patented Dec. 27, 1966

3,294,981
SIGNAL TRANSLATION EMPLOYING
TWO-STATE TECHNIQUES
Amar G. Bose, Chestnut Hill, Mass., assignor to Bose
Corporation, a corporation of Massachusetts
Filed July 19, 1963, Ser. No. 300,404
34 Claims. (Cl. 307—88.5)

This application is a continuation-in-part of abandoned U.S. application Serial No. 217,018 filed August 15, 1962.

The present invention relates in general to signal translation and more particularly concerns novel methods and means for converting a level at an input terminal into an output signal level which shifts back and forth between first and second levels at a rate that is high compared to the rate of change of the input signal level while retaining a characteristic representative of the input signal level. According to one important aspect of the invention a low level input signal may be faithfully reproduced at much higher levels at the output with great fidelity, high efficiency, and with compact lightweight components in a system relatively insensitive to parameter variations.

One exemplary embodiment of the invention comprising transistor transformerless circuitry has directly driven a loud-speaker system embodying the principles disclosed in Bose U.S. Patents Nos. 2,915,588 and 3,038,964 to faithfully reproduce recorded music at exceptionally high volume levels. Another embodiment of the invention comprises tape recording apparatus relatively free from complexity capable of recording signals as low in frequency as D.-C. with exceptionally high signal/noise ratio. Still another embodiment of the invention functions not only as a D.-C. transformer for converting a high voltage low current input signal to a low voltage high current output signal utilizing only the input signal power to effect the conversion, but also functions to maintain the output voltage substantially constant in the presence of wide variations in both input signal voltage and output signal current.

It is an important object of this invention to provide faithful amplification of an input signal with high efficiency while utilizing relatively few components in a lightweight compact arrangement.

It is another object of the invention to achieve the preceding object while raising the power level of the input signal.

It is a further object of the invention to achieve the preceding objects in providing regulation or control.

It is still a further object of the invention to provide a system in accordance with the preceding objects suitable for introducing intelligence modulation.

It is still a further object of the invention to achieve one or more of the preceding objects with an arrangement suitable for combination with like arrangements for providing analog multiplication.

It is still a further object of the invention to achieve the preceding objects with an arrangement characterized by an exceptionally wide dynamic range and high ratio of desired to undesired signal.

Still a further objective of the invention is to achieve the preceding object in an arrangement suitable for recording on magnetic tape while retaining the other desired characteristics.

A system according to the invention comprises a two-state means with an input and an output. The two-state means provides one of the first and second output levels and shifts to the other only when the level on its input shifts in a predetermined direction by a predetermined amount. An input terminal may receive an external signal. Means are provided for combining a signal on the input terminal with a signal related to the signal on the output to provide a signal for delivery to the two-state means input. Preferably, means are provided for furnishing a delay to the signal coupled from the two-state means output to its input through the combining means. The signal at the two-state means output is characterized by an instantaneous frequency and a ratio of time providing the first output level to time providing the second output level that is related to the level of the signal on the input terminal.

In a specific embodiment of the invention the rate of switching between first and second levels is high compared to the rate of change in the input signal level. Averaging means coupled to the output of the two-state means furnishes a signal representative of the signal on the input terminal. The averaging means may be a loud-speaker which receives a signal characteristics of the input signal waveform at higher power level.

According to another feature of the invention, there may be a number of like arrangements generally as described above with a respective input terminal receiving respective input signals but driving a single common averaging means whose output is then representative of the product of the signals applied to the respective input terminals.

Numerous other features, objects and advantages of the invention will become apparent from the following specification when read in connection with the accompanying drawing in which:

FIGS. 10A and 10B illustrate the mode structure characterizing a preferred embodiment of the invention;

FIG. 11 is a block diagram illustrating the logical arrangement of a system according to the invention especially useful in connection with nonlinear control systems;

FIG. 13 is a block diagram illustrating the logical arrangement of a preferred recording system according to the invention;

Figure 1:
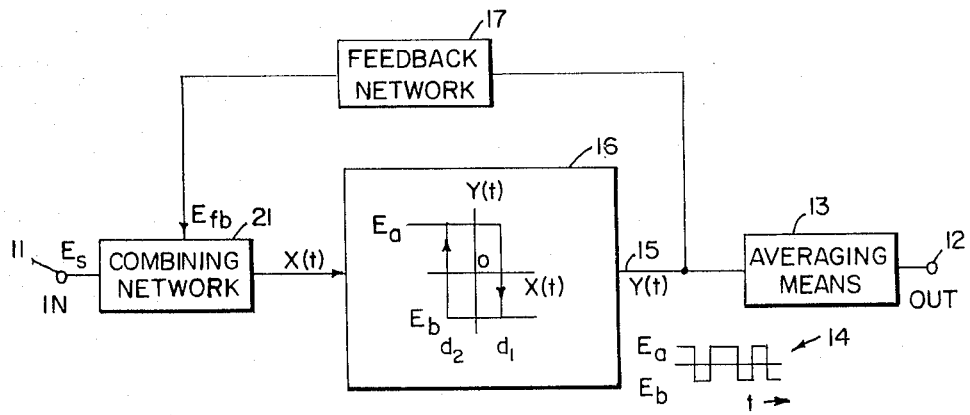
FIG. 1 is a block diagram generally illustrating the logical arrangement of a system according to the invention.

With reference now to the drawing and more particularly FIG. 1 thereof, there is shown a block diagram illustrating the logical arrangement of a system according to the invention. The waveform of an input signal applied to terminal 11 is reproduced at output terminal 12 of the averaging means 13 providing a signal on terminal 12 characteristic of the average value of the signal $y(t)$ present on output line 15 from the two-state device 16.

The signal $y(t)$ on output line 15 is also coupled by means of feedback network 17 to one input of combining means 21. Combining means 21 also receives the input signal $E_s$ on terminal 11 and combines that signal with the feedback signal $E_{fb}$ to provide the signal $x(t)$ applied to the input of the two-state device 16, this signal typically swinging above and below zero.

Two-state device 16 may have the nonlinear transfer characteristic represented. That is, when the input signal $x(t)$ exceeds an incremental value designated $d_1$, the signal on output line 15 shifts almost immediately to the level designated $E_b$ and remains at that level until the signal $x(t)$ drops to a level more negative than $d_2$. At that time the output level on line 15 suddenly shifts to the new output level of $E_a$ where it remains until the signal $x(t)$ again exceeds a level of $d_1$. The nature of the circuit arrangement is such that the signal $x(t)$ alternately assumes positive and negative values effective in alternately shifting the output level on line 15 between the two stable levels $E_a$ and $E_b$ in such a manner that the average value of the signal $y(t)$ is related to the input signal $E_s$. By averaging over a time interval which is large compared to the mean period of the cyclical variations of the output signal $y(t)$ and small compared to a period of the highest frequency spectral component in the input signal $E_s$, the signal on output terminal 12 corresponds substantially to the waveform of the input signal $E_s$. This waveform reproduction may be effected at higher power levels with low distortion over an exceptionally wide dynamic range.

Figure 2:
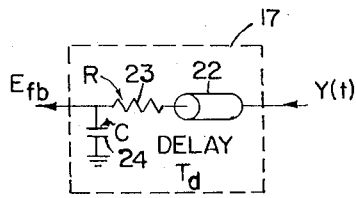
FIG. 2 is a schematic representation of a suitable feedback network for use in a system according to the invention.
Figure 3:
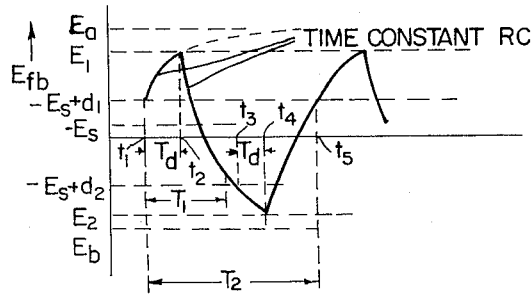
FIG. 3 is a graphical representation of a typical signal waveform applied to the input of the two-state device helpful in understanding the principles of operation of the invention.

How these results are obtained will be better understood by referring also to FIGS. 2 and 3. FIG. 2 shows a schematic circuit representation of a suitable feedback network 17 for use in a system embodying the principles of the invention and FIG. 3 shows a typical feedback signal $E_{fb}$ provided at the output of the feedback network 17 as shown in FIG. 2 when that network comprises a delay line 22 furnishing a delay of $T_d$ and an integrating network comprising a resistor 23 of value R and a condenser 24 of value C.

Referring to FIG. 3, there is shown a graphical representation as a function of time of a representative feedback signal $E_{fb}$. This signal waveform comprises exponential functions of time between break points. The significance of these break points will be better understood from the following discussion. It should first be noted that alternate break points are on opposite sides of the negative input level $E_s$ so that when combined with the input signal $E_s$ by combining means 21, the waveform in FIG. 3 corresponds substantially to the waveform $x(t)$ except that successive break points alternate between levels below and above zero for the latter waveform. Thus, combining means 21 normally algebraically combines the signal $E_s$ and the signal $E_{fb}$ so that the resultant signal $x(t)$ fluctuates about zero.

Consider the signal waveform at the time $t_1$, it being convenient to assume at this time that the two-state device 16 has just shifted to provide the output level $E_b$ on output line 15. Since switching has just occurred at this time, the signal $E_{fb}(t)$ is $d_1$ above minus the input signal $E_s$. At this time the signal on line 15 has just shifted from $E_a$ to $E_b$. But the signal $E_{fb}$ continues to rise exponentially to $E_a$ for the delay interval $T_d$ corresponding to the delay furnished by the delay means 22 in feedback network 17. At the end of this delay interval, corresponding to time $t_2$, the feedback signal $E_{fb}$ begins decreasing exponentially as a function of time toward the potential $E_b$. When this potential drops $E_s+d_2$ at time $t_3$, the signal level on line 15 suddenly shifts from $E_b$ to $E_a$. The feedback potential $E_{fb}$ continues to decrease exponentially toward $E_b$ for the delay time interval $T_d$. Then at time $t_4$ it begins rising exponentially toward the potential $E_b$. When this potential drops $E_s+d_2$ at time time $t_5$, the two-state device 16 again shifts to the stable state providing the level $E_b$ on line 15 to repeat the cycle just described.

The time constant of the illustrated exponential waveforms is determined by RC, the values of the parameters in the integrating network comprising resistor 23 and capacitor 24. This time constant is preferably short compared to the period of the highest frequency spectral component of interest in the input signal $E_s$.

A study of the signal waveform represented in FIG. 3 discloses some interesting properties of the invention. As the signal $E_s$ rises closer to the potential $E_a$, the duration $T_1$ during which two-state device 16 is in the stable state providing level $E_b$ on line 15 becomes a larger fraction of the complete cycle $T_2$. The average value of the output rectangular signal waveform over a cycle therefore decreases with an increase in the signal $E_s$ and conversely increases with a fall in that level. It can be shown that this average level, $E_{av}$, as a function of input signal level $E_s$ is given by the following equation:

$$E_{av} = \frac{\ln(d_2-E_s-E_b) - \ln[E_a-E_b+(d_1-E_s-E_a)\epsilon^{-T_d/RC}] - T_d/RC}{\ln(d_2-E_s-E_b) - \ln[E_a-E_b+(d_1-E_s-E_a)\epsilon^{-T_d/RC}]} (E_b-E_a) + E_a \quad (1)$$
$$+ \ln(E_a+E_s-d_1) - \ln[E_a-E_b+(E_b+E_s-d_2)\epsilon^{-T_d/RC}] - 2T_d/RC$$

In a practical embodiment of the invention, it is convenient to establish the potential $E_a=E_o=-E_b$ and $d_1=d=-d_2$. Under these conditions and recognizing that the exponential is taken to a negative power sufficiently small so that the exponential term may be approximated as unity, this expression reduces to (2)
$$\frac{E_{av}}{E_o} = 1 - 2 \frac{\ln\frac{1-E_s/E_o-d/E_o}{1-E_s/E_o+d/E_o} - T_d/RC}{\ln\frac{(1-E_s/E_o-d/E_o)(1+E_s/E_o-d/E_o)}{(1-E_s/E_o+d/E_o)(1+E_s/E_o+d/E_o)} - 2T_d/RC}$$

It is preferred that the signal level $E_s$ be less than $E_o$ and that the switching level $d$ be a small fraction of the potential $E_o$. The smaller the ratio of $d$ to $E_o$ and $E_s$ to $E_o$, the better the linearity of the system. Yet, with a $T_d=0$, $d/E_o$ of 0.1 and $E_s/E_o$ as high as 0.75, the deviation from linearity is but 1.33 percent under relatively unfavorable conditions.

Another property of the invention is that in addition to the ratio of time in one stable state to the time in the other stable state changing as a function of input signal level $E_s$, the total duration $T_2$ also changes. It can be shown that the time interval $T_2$ is given by:

(3)
$$T_2 = 2T_d + RC \ln \frac{[E_a - E_b + (d_1 - E_s - E_a)\epsilon^{-Td/RC}][E_a - E_b + (E_b + E_s - d_2)\epsilon^{-Td/RC}]}{(d_2 - E_s - E_b)(E_a + E_s - d_1)}$$

This equation may be rewritten for $d_1 = \text{\_\_\_\_\_}$, $d_2 = d$ and $E_a = -E_b = E_o$ as:

(4)
$$T_2 = 2T_d + RC \ln \frac{[2E_o - (E_o - d)\epsilon^{-Td/RC}]^2 - E_s \epsilon^{2-2Td/RC}}{(E_o - d)^2 - E_s^2}$$

It is preferred that the sum of $E_s$ and $d$ be less than $E_o$. It can then be shown that $d/E_s$ is a function of $T_2/RC$ in that the input signal $E_s$ is directly proportional to the instantaneous output frequency on line 15. This is a very useful result because both the average value and the frequency of the signal line 15 are characteristic of the input level $E_s$. Thus, either averaging means 13 as shown may be used for detection, or detection may be accomplished with an axis crossing detector or other suitable frequency sensitive discriminator.

Figure 4:
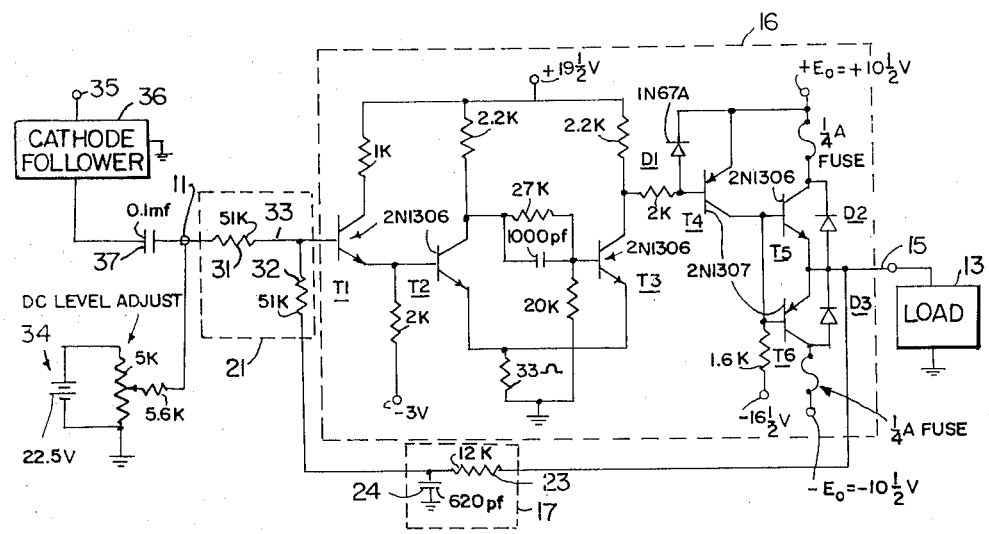
FIG. 4 is a schematic circuit diagram of an exemplary embodiment of the invention.

With reference now to FIG. 4, there is shown a schematic circuit diagram of an exemplary embodiment of the invention utilizing an efficient transistor circuit to provide a frequency response which may extend down to D.-C. while extending high into the audio frequency range without requiring a transformer.

The two-state device 16 comprises six transistors T1–T6 and associated circuit components. Transistors T2 and T3 and associated circuit components comprise a Schmitt trigger circuit having two stable states, one with transistor T2 on and transistor T3 off; the other with transistor T2 off and transistor T3 on. Transistor T1 functions as an emitter follower for coupling the switching signal $x(t)$ to the base of transistor T2.

Combining means 21 comprises the equal resistors 31 and 32 whose common junction 33 is connected to the base of transistor T1. The other end of resistor 31 is connected to input terminal 11. The other end of resistor 32 is connected to the output of feedback network 17.

Feedback network 17 comprises capacitor 24 and resistor 23, the delay $T_d$ being furnished by the inherent delay in the circuit. The input of feedback network 17 is connected to line 15, where the emitters of complementary output transistors T5 and T6 are connected.

Figure 5:
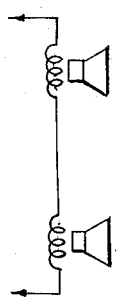
FIG. 5 is a schematic circuit diagram of a suitable loud-speaker load for the circuit of FIG. 4.

The load 13 is connected between line 15 and ground. When load 13 comprises a pair of loudspeakers connected in series as shown in FIG. 5, the load functions as averaging means so that the transduced audio signal delivered by the loudspeakers corresponds substantially to the waveform on input terminal 11.

A biasing network 34 functions to establish a D.-C. potential on terminal 11 so that when the input signal $E_s$ is substantially zero, the D.-C. component of switching signal $x(t)$ is also substantially zero.

Diodes D2 and D3, while not essential, function to conduct delayed current through an inductive load 13, around transistors T5 and T6, respectively, when a respective transistor is cut off.

For amplifying an audio signal present on a terminal 35, a cathode follower 36 and capacitor 37 couple this signal to input terminal 11.

Transistor T4 functions as an amplifier for amplifying the switching signal developed on the collector of transistor T3 and applying the amplified signal to the bases of complementary output transistors T5 and T6. A diode D1 prevents breakdown of the base-emitter junction of transistor T4.

Having described the physical arrangement of the circuit according to the invention, the mode of operation of the specific circuit will now be described. Consider a situation in which transistor T2 has just been turned on and transistor T3 turned off. The collector of transistor T3 is then high, cutting transistor T4 off and causing its collector to go negative which in turn turns NPN transistor T5 off and PNP transistor T6 on, thereby bringing line 15 essentially to a potential of $-E_o$.

Condenser 24 then begins to charge toward the potential $-E_o$, causing the base of transistor T1, and hence the base of transistor T2, to become more negative until NPN transistor T2 is cut off, the rise in potential on its collector being transmitted to the base of transistor T3 and causing it to turn on.

The potential on the collector of transistor T3 then drops, causing transistor T4 to turn on, producing a rise in potential on its collector which renders NPN transistor T5 conductive and cuts PNP transistor T6 off. Output line 15 then assumes substantially the potential $E_o$ and capacitor 24 then begins to charge to this value. The rise in potential on capacitor 24 is transmitted to the base of transistor T1, causing it to conduct more fully and raise the potential on the base of transistor T2 until this transistor again conducts and transistor T3 cuts off to commence another of the cycles just described.

Since the exact time of switching is dependent upon the total potential on junction 33 for the reasons discussed above in connection with describing the block diagram of FIG. 1, the signal waveform on line 15 is a substantially rectangular waveform crossing the zero level at a rate related to the signal $E_s$ on terminal 11 and having a ratio of time in positive level to time in negative level related to the input signal $E_s$.

The switching between levels in the circuit of FIG. 4 occurs at a supersonic rate. When this signal is applied to a load 13 comprising the loudspeakers in series shown in FIG. 5, typically 4 inch speakers with 24 ohm voice coils, the loudspeakers themselves function as the averaging means so that the audio signal applied to terminal 35 is actually reproduced as a sound wave by the loudspeakers.

The invention has a number of advantages. The power output transistors T5 and T6 actually dissipate very little power. When they are conducting and delivering high current to the load, the voltage across the transistor is very low. When the voltage across the transistor is high, the transistor is not conducting. Since power is related to the product of voltage times current integrated over a period, power is low because the product waveform is very small, even though the individual voltages and currents may assume high peak values.

Observations of the output signal on line 15 with an oscilloscope confirm the theory that both frequency and ratio of time in the positive level to time in the negative level vary as a function of the input signal $E_s$.

Figure 6:
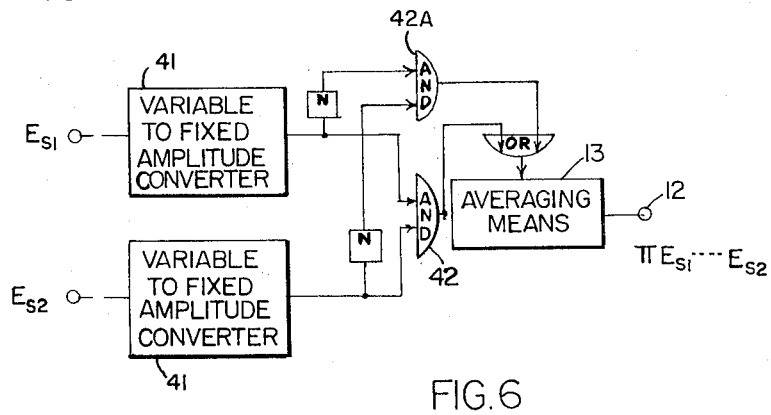
FIG. 6 is a block diagram of a multiplying system according to the invention.

Referring to FIG. 6, there is shown a multiplying system which takes advantage of the properties of the invention for providing an output signal related to the product of input signals $E_{s1}$ and $E_{s2}$. Each input signal is applied to a variable to fixed amplitude converter 41 comprising all the elements shown in FIG. 1 except the averaging means 13. The output lines 15 from each variable to fixed amplitude converter 41 is applied to a leg of an AND gate 42. The output of AND gate 42 energizes averaging means 13 to provide an output signal on terminal 12 representative of the product of the input signals $E_{s1} \ldots E_{s2}$. This system works because the signals $y_1(t)$ and $y_2(t)$ on the lines 15 are statistically independent. Therefore, the average of the product equals the product of the averages of the individual signals on the lines 15. This multiplication system works if the average value of $y(t)$ represents $E_s(t)$. Thus, each $y(t)$ might be a PDM wave that is statistically independent of the other, or a train of constant duration unipolar pulses occurring at a rate representative of $E_s(t)$.

Figure 7:
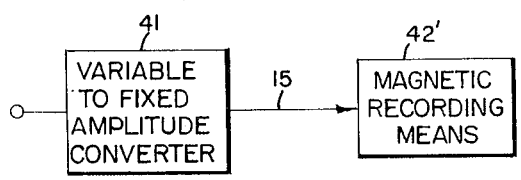
FIG. 7 is a block diagram of magnetic recording means embodying the principles of the invention.

Referring to FIG. 7, there is shown still another system taking advantage of the properties of the invention in which a variable to fixed amplitude converter 41 drives a magnetic recording means 42' to record an input signal $E_s$ with wide dynamic range. The signal on line 15 may be applied directly to the recording amplifier of a magnetic recording means and the readout transducer will function as averaging means to reproduce the signal $E_s$.

A number of variations and uses of the invention have been described. Another form which the invention may take comprises a data transmission system in which the transmitting end provides the signal $y(t)$ to the transmission medium and the receiving end includes the averaging means 13. The transmission medium may be a transmission line, high frequency carrier modulated with $y(t)$ or other suitable transmission medium.

The invention is also applicable to servo and other control systems. For example, the signal $y(t)$ may be applied to the input of a power supply low pass filter providing D.-C. at its output. If the input signal $E_s$ is a stable fixed reference potential, such as that provided by a Zener diode, the output D.-C. remains the same, regardless of variations in load current.

Figure 8:
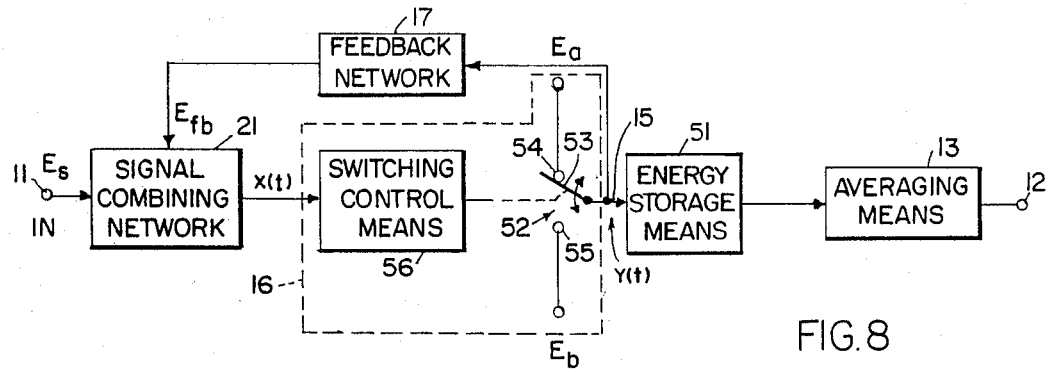
FIG. 8 is a block diagram illustrating the logical arrangement of a basic system according to the invention.

Referring to FIG. 8, there is shown a block diagram illustrating the logical arrangement of a basic system according to the invention. This system characterizes the circuit of FIG. 4 when the load 13 comprises the loudspeakers of FIG. 5 and also characterizes other embodiments according to the invention to be described in greater detail below. The system of FIG. 8 incorporates the elements of FIG. 1 and additionally includes energy storage means 51 coupling the output line 15 of two-state device 16 to averaging means 13. Two-state device 16 is shown divided into several components. Two-state device 16 comprises a single pole-double throw switch 52 with its arm 53 coupled to two-state device output line 15. The top contact 54 is connected to a source of the potential $E_a$ and the bottom contact 55 is coupled to a source of the potential $E_b$. The switching control means 56 receives the signal $x(t)$ from combining network 21 and responds to this signal by causing arm 53, or its electrical equivalent, to switch back and forth between fixed contacts 54 and 55 at a rate and for durations related to signal $E_s$ applied to input terminal 11.

The energy storage means 51 and the averaging means 13 may comprise the elements of the loudspeaker system shown in FIG. 5. For example, the inductance of voice coils stores super audio switching frequency currents. The physical mass of the voice coil and loudspeaker cone functions as an averaging means causing the loudspeaker to respond to audio frequency spectral components.

Figure 9:
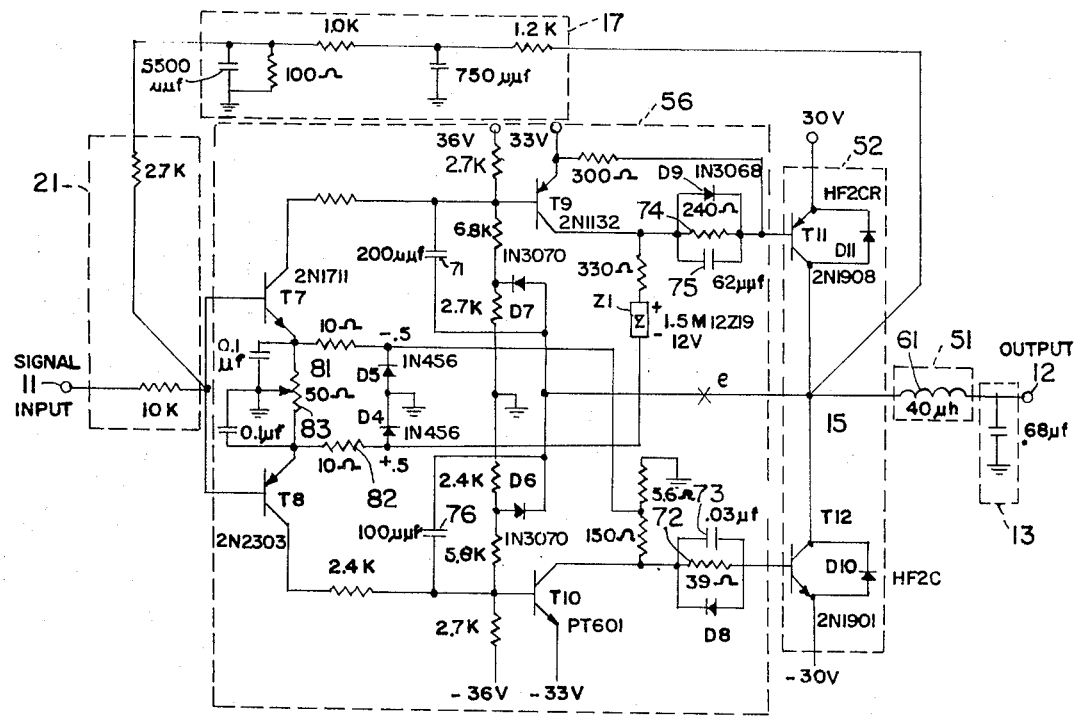
FIG. 9 is a schematic circuit diagram of a power amplifier according to the invention.

Referring to FIG. 9, there is shown a schematic circuit diagram of a preferred embodiment of the invention capable of delivering 15 watts of peak power to a 16 ohm loudspeaker with remarkable fidelity over the full range of audio frequencies including D.-C. It will be observed that the single-pole double-throw switch 52 in the embodiment of FIG. 8 insures that the output line 15 is never connected to the potentials $E_a$ and $E_b$ at the same time. This characteristic of the transistor switch equivalent comprising transistors T11 and T12 is one important feature of the especially advantageous embodiment shown in FIG. 9. It has been discovered that if transistors T11 and T12 conduct simultaneously they present an extremely low impedance path between the plus 30 and minus 30 volt supplies with the result that the one or both of the transistors T11 and T12 might burn out. How the present invention prevents simultaneous conduction by both transistors T11 and T12 while still insuring that in virtually every possible case the amplifier will function immediately upon applying power will be understood better by considering the following brief description of the operation of the invention with the initial assumption that transistor T12 is initially conductive upon applying potentials of 30 volts magnitude to the emitters of PNP transistor T11 and NPN transistor T12. It will be shown later that the circuit configuration insures the correctness of this assumption. It is also convenient to initially assume that the potential on signal input terminal 11 is zero, although the assumption that transistor T12 initially conducts is also correct if this potential is initially positive. The preferred mode of operation is such that if this potential is initially negative, the amplifier will simply not start operating until the negative potential is removed from terminal 11. It will be shown below that this preferred mode protects transistors T11 and T12.

With transistor T12 conducting and transistor T11 cut off, the potential on line 15 becomes $E_b=-30$ volts. This potential fall from the initial zero value is applied to the input of feedback network 17 which provides the falling exponential, described in detail above, that is applied to signal combining network 21 and combined with the signal on input terminal 11 to maintain NPN transistor T7 nonconductive and render PNP transistor T8 conductive. The sequence of steps now to be described will first render transistor T12 nonconductive and shortly thereafter transistor T11 conductive.

With transistor T8 conducting, the potential on its collector, which is direct-coupled to the base of transistor T10, is sufficiently high to render that NPN transistor conducting. With transistor T10 conducting, its collector becomes sufficiently negative to render transistor T12 nonconductive when coupled to the base of the latter by diode D8 shunted by resistor 72 and capacitor 73.

With transistor T12 cut off and before transistor T11 is turned on, diode D11 functions to continue to conduct current from inductor 61 to the emitter of transistor T11 until transistor T11 conducts. Diode D11 is rendered conductive during this time interval by the voltage pulse developed across inductor 61 in response to transistor T12 cutting off and applies the potential $E_a$ of slightly greater than 30 volts to line 15, the excess over 30 volts being developed across the clamping diode. This same voltage pulse is coupled from line 15 through capacitor 71 and diode D7 to the base of transistor T9 to cut that transistor off which in turn renders transistor T11 conductive.

With transistor T11 conducting, the potential on line 15 is locked to the potential $E_a$ of $+30$ volts. The change in potential on line 15 from $-30$ to $+30$ is applied to the input of feedback network 17 which provides the exponentially increasing waveform described above at its output. This exponentially increasing waveform is applied to combining network 21 so that the potential at the output of that network increases sufficiently to cut transistor T8 off and render transistor T7 conductive. The sudden fall in potential on the collector of transistor T7 renders transistor T9 conductive, and, a sequence of events similar to those described immediately above occurs, leading to returning transistors T11 and T12 to nonconductive and conductive states respectively.

Inductor 61 performs some important functions. It insures rapid switching between the potential $E_a$ and $E_b$ during the intervals when transistors T11 and T12 change conductive states. This rapid switching is accomplished when inductor 61 develops a potential in response to one of transistors T11 and T12 being cut off. This potential is sufficient to render the diode across the other of said transistors conductive at least until the other of said transistors itself conducts. The inductance L of inductor 61 is small enough to insure that the current therethrough reverses once during each conducting interval of transistors T11 and T12. The inductance L is preferably as high as practical consistent with meeting the preceding condition and maintaining the desired switching modes. While the minimum value of inductance L is less critical, it is preferably not so small that transistors T11 and T12 deliver excessive peak currents.

Stated in algebraic form, an optimum value of L is believed to be $$L = [E_o/I_o][T_1 - T_1/T_2(T_1 + 2T_c)]$$

where $E_o$ is the magnitude of the peak potential coupled to line 15 by the transistors T11 and T12, $I_o$ is the maximum D.-C. current which the circuit delivers to a load, $T_1$ is the shortest time interval in which the signal on line 15 remains in one of the two states, $T_2$ is the sum of the latter shortest interval and the immediately preceding interval in which the signal on line 15 is in the other of the two states, and $T_c$ is the time interval between one of diodes D10 and D11 beginning to conduct and the associated one of transistors T11 and T12 shortly thereafter beginning to conduct. The intervals $T_1$ and $T_2$ occur when the input signal magnitude is a maximum. Thus, in the exemplary embodiment with $E_o + 30$ volts, $I_o = 1$ amp, $T_1 = 2.75$ μsec., $T_2 = 11.0$ μsec., and $T_c = 1.25$ μsec., $L = 43.125$ μh. from the analytic computation. In the exemplary embodiment, the slightly smaller value of 40 μh. was determined on an experimental basis. It is preferred that inductor 61 have very low ohmic resistance to minimize power losses in this inductor.

Once a value of inductance L is selected for inductor 61, the value of capacitance C for the capacitor comprising averaging means 13 is selected so that the resonant frequency $2\pi/\sqrt{LC}$ is less than the switching frequency and greater than the highest spectral component of interest in the input signal applied to input terminal 11.

The circuit of FIG. 9 incorporates an especially advantageous feature which makes it virtually impossible for transistors T11 and T12 to conduct simultaneously, even during the turn-on period when the supply voltage is building up. The functioning of this feature of the circuit will be better understood from the following discussion explaining the different circuit modes. Since transistors T11 and T12 can be either conducting or nonconducting when functioning as electronic switches, there are four possible modes set forth in the chart of FIG. 10A. If we imagine breaking the internal feedback loop from output line 15 to the junction of diodes D6 and D7 and if we designate the potential on line 15 as $e$, the modes as a function of $e$ between the limits $-E_o$ and $E_o$ are shown in FIG. 10B. Note that the undesired fourth mode with both transistors T11 and T12 on is precluded by virtue of the biasing structure which insures that there is a range of potentials for $e$ between $E_a$ and $E_b$ where both transistors T11 and T12 are off. To establish mode two, there must be a range of potentials between $E_a$ and $E_b$ where both transistors T9 and T10 conduct simultaneously. To this end the anode of diode D6 is connected to a point maintained at the potential $E_2$ of substantially $-8$ volts while the cathode of diode D7 is connected to the potential $E_1$ of substantially 7 volts. Thus, when the potential $e$ on line 15 is greater than $E_1$, diode D7 conducts to keep transistor T9 nonconducting and thereby to keep transistor T11 conducting. Acceleration of transistor T9 to the nonconducting state is affected by coupling the initial rise in potential of line 15 through speedup capacitor 71.

In a similar manner when the potential $e$ on line 15 becomes less than $E_1$, diode D6 conducts to cut off NPN transistor T10 and keep this transistor cut off, which in turn keeps NPN transistor T12 conducting. Acceleration of transistor T10 to the nonconducting state is effected by coupling the initial fall in potential to its base through switching speedup capacitor 76.

The Zener diode Z1 functions to establish mode 1 when power is initially applied to the circuit by initially keeping transistor T11 off. During supply build-up, Zener diode Z1 prevents transistor T11 from conducting. Therefore, transistor T12 becomes conducting when the circuit is initially turned on unless the potential then on signal input terminal 11 is negative. In that case, the circuit would simply not switch until the negative input on terminal 11 were momentarily removed, for example by momentarily opening or grounding this terminal.

The circuit comprising diodes D4, D5, resistor 81, resistor 82 and potentiometer 83 function to control the separation in volts between $d_1$ and $d_2$, potentiometer 83 being adjustable to displace $d_1$ and $d_2$ about ground potential. In the specific circuit shown $d_1$ is approximately 0.2 volt and $d_2$ is approximately $-0.2$ volt. Each end of potentiometer 83 is capacitively bypassed to ground so that the emitters of transistors T7 and T8 are effectively grounded at the switching frequency.

In the specific circuit shown in FIG. 9 the switching frequency is about 140 kc. with a duty cycle of 50 percent when the potential on input terminal 11 is zero volts to produce a D.-C. potential of zero volts on terminal 12. Output terminal 12 accurately reproduces the waveform of an input voltage on terminal 11, as large as 2.0 volts R.M.S., at much higher current levels for a power amplification of greater than 40 db. This circuit has actually driven a 16 ohm loudspeaker system of the type described in Bose Patents Nos. 2,915,588 and 3,038,964 to reproduce sound levels in a room in excess of normal listening levels with remarkable fidelity. An operative embodiment of the invention, carrying out the principles of the circuit of FIG. 9 with the mode structure of FIG. 10, has been constructed using only four transistors.

Referring to FIG. 11 there is shown a block diagram illustrating the logical arrangement of a system according to the invention especially useful in connection with nonlinear control systems. The system of FIG. 10 includes switching means 91 responsive to switching control means 56 for alternately connecting output line 15 between the potentials $E_a$ and $E_b$. A feedback network 17 couples line 15 to a combining network 92 which combines not only the input signal $E_s$ on terminal 11 with the feedback signal $E_{fb}$ but also another feedback signal $E_{fb}'$ provided by a second feedback network 93 which receives its signal from the output terminal 12. Averaging means 13 couples the output of energy storage means 51 to output terminal 12.

The switch 91 utilizes a pair of single-pole single-throw switches 94 and 95 to alternately connect the potential $E_a$ and $E_b$ to line 15. Feedback network 17 performs the function described above of maintaining the loop of which it is a part in high frequency oscillation. Feedback network 93 performs the function of maintaining the signal on terminal 12 at a level determined by the signal $E_s$ on input terminal 11. Thus, if averaging means 13 comprises a motor to be driven at a prescribed velocity, a signal applied to terminal 11 may be used to control that velocity. The system may also be used for temperature control or exercising control over other parameters of a process.

Figure 12:
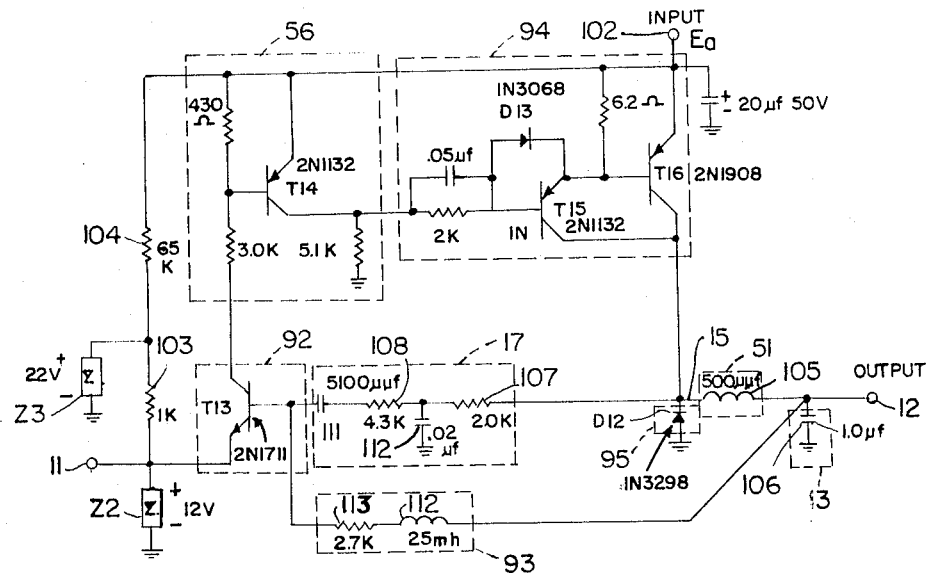
FIG. 12 is a schematic circuit diagram of an embodiment of the invention that maintains an output potential constant irrespective of variations in input potential and output load current.

Referring to FIG. 12, there is shown a schematic circuit diagram of an especially advantageous embodiment of the invention for maintaining the output potential on terminal 12 constant in the presence of wide variations in either or both of input potential or output load. The illustrated embodiment actually functions as a D.-C. transformer for converting power delivered at high voltage and low current at the input to power delivered to a load that draws more current at lower voltage. Thus, a potential of $E_a$ on input terminal 102 at low current is converted to a substantially constant lower potential on terminal 12 which may be applied to a load that draws higher current while the potential source applied to terminal 102 delivers operating power to all the active circuit elements.

Combining network 92 comprises transistor T13 whose emitter terminal 11 is maintained at a substantially constant potential by Zener diode Z2. This potential is substantially equal to the constant potential on output terminal 12. Regulation is enhanced by connecting resistors 103 and 104 in series with terminal 102 and maintaining the junction between resistors 103 and 104 at a substantially constant potential of 22 volts with Zener diode Z3. This additional Zener diode is useful because the circuit itself provides better regulation of voltage than a single Zener diode.

Switching control means 56 comprises transistor T14 and associated circuit components with switch 94 comprising transistors T15 and T16 in a Darlington connection to increase the effective beta while switch 95 comprises diode D12. Energy storage means 51 comprises inductor 105 connected between line 15 and output terminal 12 while averaging means 13 comprises capacitor 106.

Feedback network 17 comprises resistors 107 and 108 in series with capacitor 111 while capacitor 112 is connected between the junction of resistors 107 and 108 and ground. Capacitor 111 couples the relatively high frequency switching signal to the base of transistor T13 while feedback network 93 comprising inductor 112 in series with resistor 113 couples the relatively low frequency signal component, including the D.-C. component, at output terminal 12 to the base of transistor T13. The collector of NPN transistor T13 is direct-coupled to the base of PNP transistor T14.

Operation is as follows. It is convenient to initially assume that transistor T16 is conducting so that line 15 is substantially at the potential $E_a$ while diode D12 is nonconducting. This rise in potential is integrated by feedback network 17 and coupled through capacitor 111 to the base of transistor T13 so that when the resultant potential on the base of transistor T14 and causes that of transistor T13, that transistor conducts to lower the potential on the base of transistor T14 and causes that transistor to conduct. With transistor T14 conducting, the potential on the base of transistor T15 rises to cut off transistors T15 and T16 and cause the potential on line 15 to drop substantially to ground potential where it is clamped by diode D12. The latter conducts whenever transistor T16 is cut off. Diode D13 helps remove stored charge from the base of transistor T16 to speed switching. This drop in potential is integrated by network 17 and transmitted through coupling capacitor 111 until the resultant potential on the base of transistor T13 drops below that of potential on the emitter of that transistor to cut that transistor off and allow the potential on the base of transistor T14 to rise so that transistor is cut off. With transistor T14 cut off the potential on the base of transistor T15 drops to turn transistors T15 and T16 on and again return line 15 to substantially the potential $E_a$.

In this embodiment of the invention, it is preferred that inductor 105 be as large as practical consistent with keeping its D.-C. resistance very low. The value of capacitor 106 is selected so that the resonant frequency of capacitor 106 with inductor 105 is less than the switching frequency.

Now the exact instant of switching depends upon the potential on the emitter of transistor T13, maintained substantially fixed by Zener diode Z2, and the potential on the base of transistor T13. Since feedback network 93 direct couples output terminal 12 to that base, the switching instant depends upon the potential on terminal 12 as well as the higher frequency signal at the circuit switching frequency transmitted by coupling capacitor 111. With this circuit arrangement in accordance with the principles of the invention, the on time of transistors T15 and T16 relative to the off time assumes a ratio which maintains the D.-C. potential on terminal 12 substantially constant regardless of the load current drawn from terminal 12 and regardless of the potential on terminal 102 over relatively wide ranges. For example, an ordinary 45 volt battery which delivers 400 milliamperes to terminal 102 has supplied the operating power for all the active circuit components and still delivered an amp of current to an ordinary automobile 12-volt light bulb so that it is virtually impossible to detect a change in brightness in a bulb continuously energized from terminal 12 as a second bulb is alternately connected and removed from that terminal. Also, dropping the potential on terminal 102 to 22.5 volts with a bulb connected to terminal 12 results in no perceptible observation of change in brightness or change in terminal 12 potential as observed on a Simpson Model 260 voltmeter.

Referring to FIG. 13 there is still another embodiment of the invention especially useful for recording and reproducing recorded data including spectral components down to D.-C. while maintaining an exceptionally high signal-to-noise ratio. A signal on terminal 11 is converted by amplitude to time modulation converter 120, which may be any of the specific schematic circuits described above or other suitable converters, into a waveform 121 whose average amplitude value between level changes of like sense is representative of the amplitude on terminal 11. The waveform 121 is applied to recording head 122 to produce a corresponding magnetization pattern on magnetic tape 123. Readout head 124 scans the recorded signal on tape 123 to produce the pulse train 125, each pulse corresponding to the level change in waveform 121 of appropriate sense. The peak detector and waveform reconstructor 126 then responds to these pulses to produce a rectangular waveform 127 corresponding substantially to waveform 121. Averaging means 13 then responds to this waveform to produce the signal on terminal 12 corresponding to that previously applied on terminal 11 and recorded on tape 123.

Figure 14:
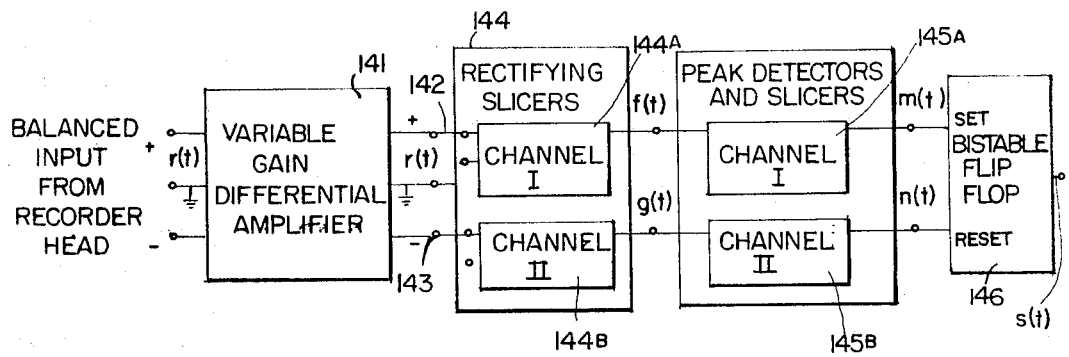
FIG. 14 is a block diagram of an exemplary system for reconstructing a previously recorded waveform according to the invention.

Referring to FIG. 14, there is shown a block diagram illustrating the logical arrangement of a suitable embodiment of the peak detector and waveform reconstructor 126. A variable gain differential amplifier 141 receives the balanced readout signal $r(t)$ at its input from readout head 124 and provides this readout signal amplified on +line 142 and amplified but inverted in polarity on —line 143. The amplified signal is applied to the channel I rectifying slicer 144A, and the inverted amplified signal is applied to the channel II rectifying slicer 144B to provide the pulse trains $f(t)$ and $g(t)$ at the output of these rectifying slicers, respectively. The time relationship of these signal waveforms to the readout signal $r(t)$ is graphically represented in FIG. 15.

Figure 15:
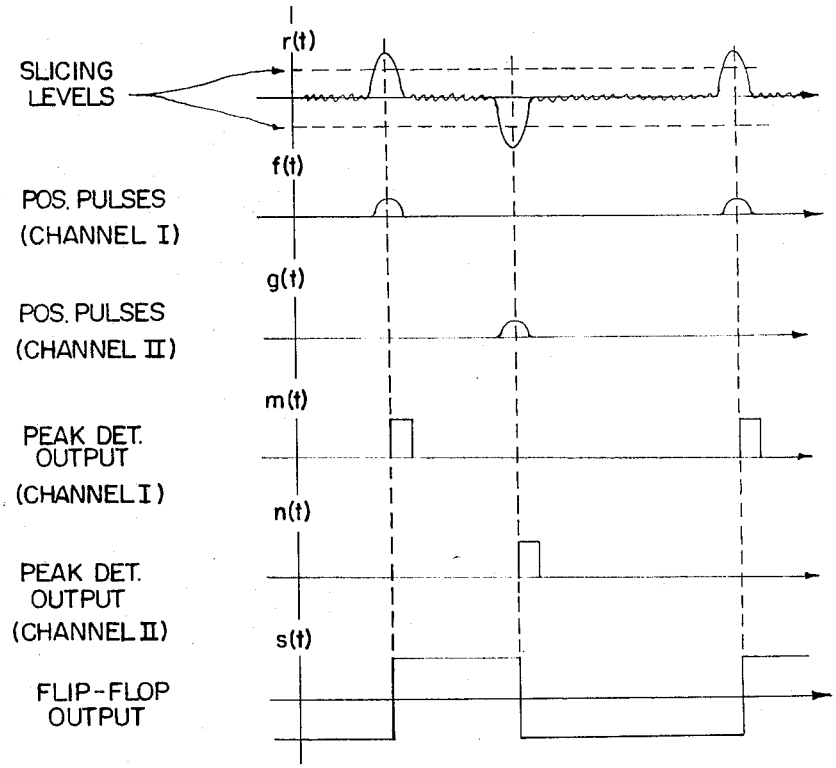
FIG. 15 is a graphical representation of pertinent signal waveforms plotted to a common time scale helpful in understanding the operation of the system of FIG. 14.

The signals $f(t)$ and $g(t)$ are applied to the respective channel I and channel II peak detectors and slicers 145A and 145B which respectively provide the trigger pulses $m(t)$ and $n(t)$ having leading edges that coincide with instants when positive and negative pulses, respectively, of the readout signal $r(t)$ have zero slope, as shown in FIG. 15. The trigger pulses $m(t)$ and $n(t)$ trigger set and reset inputs, respectively, of flip-flop 146 which provides the signal $S(t)$ 127 at its output constituting a substantial reconstruction of the signal 121 previously applied to writing head 122. In an exemplary embodiment of the invention capable of recording signals with spectral components from D.-C. to 300 c.p.s. while maintaining a signal-to-noise ratio greater than 65 db in the record-reproduction process, a number of modular units commercially available from Digital Equipment Corporation in Maynard, Massachusetts were employed. Variable gain differential amplifier 141 was one of the two channels available in a DEC 1536 unit. Rectifying slicers 144A and 144B were two of the three channels available in a DEC 1542 unit. Peak detectors and slicers 145A and 145B were both channels of the DEC 1539 unit.

Figure 16:
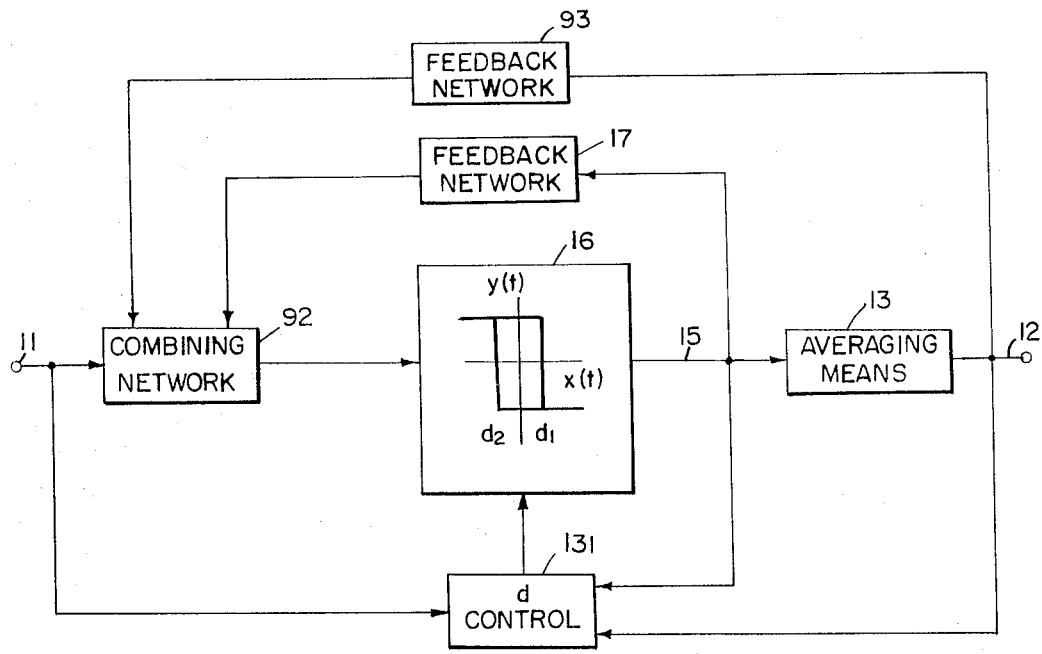
FIG. 16 is a block diagram of an improved system according to the invention characterized by improved linearity and regulating characteristics over a wide dynamic range.

Referring to FIG. 16, there is shown a block diagram illustrating the logical arrangement of still another variation of the invention in which $d_1$ and $d_2$ are selectively controlled. When the invention is used as an amplifier, the linearity and dynamic performance (response to A.-C. signals) are functions of $d_1$ and $d_2$. When the invention is used to keep an output, such as voltage, constant, the regulation is a function of $d_1$ and $d_2$.

Improvements can be effected in the system performance by controlling $d_1$ and $d_2$ in accordance with signals at one or more points in the system. For example, if a signal derived from the magnitude of the input signal or from the magnitude of the output signal is used to control $d_1$ and $d_2$ so that the different $d$ therebetween is inversely proportional to the magnitude of the input or output signal, the amplifier linearity may be improved. This improvement may be effected because the degree of non-linearity varies directly with the magnitude of input or output signal magnitude and varies inversely with the magnitude of $d$.

In FIG. 16 the $d$ control unit 131 is shown receiving control signals from the input terminal 11, the output line 15 of two-state device 16 and from output terminal 12. Any one or more of these signals may be used to develop signals that are applied to the emitters of transistors T7 and T8 of FIG. 9, for example, instead of the potentials established by diodes D4 and D5, to control $d_1$ and $d_2$. Since the circuitry could be as simple as appropriately poled diodes rectifying one or more of these signals to bias the emitters of transistors T7 and T8, those skilled in the art will be able to practice this aspect of the invention from the foregoing discussion.

There has been described a number of specific embodiments of the invention. While the present invention has been described in connection with electrical circuits, it is evident that the principles of this invention are applicable in numerous other systems in which the output signal is mechanical, electrical, thermal, or other types or combinations thereof. It is evident that those skilled in the art may now make numerous modifications of and departures from the specific embodiments described herein without departing from the inventive concepts in connection with applying the principles of this invention. Consequently, the invention is to be construed as limited solely by the spirit and scope of the appended claims.

What is claimed is:

1. Signal translation apparatus comprising,
   a two-state device having an input and an output for providing one of first and second output levels and shifting to the other only is response to a predetermined shift in the level on said input,
   an input terminal for receiving an external signal,
   means for combining a feedback signal related to the signal on said output with the signal applied to said input terminal to provide a combined signal at the combining means output,
   means for coupling the output of said combining means to said input to shift said two-state device output between said first and second levels whereby the signal at said output includes a characteristic representative of the signal at said input terminal,
   said output signal characteristic being its average value over a cycle,
   averaging means,
   and means for coupling said two-state device output to said averaging means to provide a signal having a waveform corresponding substantially to that of the signal then received by said input terminal,
   said means for coupling including essentially non-dissipative means for blocking spectral components of the energy at said two-state device output from said averaging means which spectral components are of frequency at least as high as the rate at which the shift between said first and second levels occurs.

2. Signal translation apparatus in accordance with claim 1 and further comprising,
   a feedback network having its input coupled to said two-state device output and its output coupled to an input of said combining means for providing said feedback signal,
   said feedback means including means responsive to the signal on said two-state device output for providing said feedback signal with a period corresponding to that on the latter output and with amplitude as a function of time arranged for algebraic combination with that on said input terminal to produce switching of said two-state device in response to and after each change in level on said two-state device output to control the ratio of time in said second output level to time in said first output level in accordance with the level on said input terminal.

3. Signal translation apparatus in accordance with claim 2 wherein
   said feedback network includes an integrating circuit for converting a signal of generally rectangular waveform on said two-state device output into a waveform comprising exponentially rising segments alternating with exponentially falling segments.

4. Signal translation apparatus in accordance with claim 3 wherein
   said feedback network and said combining means comprise means for direct coupling the output of said two-state device to the output of said combining means whereby said combined signal includes a component corresponding to the level on said input terminal and a component corresponding to the average value of said output signal over a cycle.

5. Signal translation apparatus comprising,
   a two-state device having an input and an output for for providing one of first and second output levels and shifting to the other only in response to a predetermined shift in the level on said input,
   an input terminal for receiving an external signal,
   means for combining a feedback signal related to the signal on said output with the signal applied to said input terminal to provide a combined signal at the combining means output,
   means for coupling the output of said combining means to said input to shift said two-state device output between said first and second levels whereby the signal at said output includes a characteristic representative of the signal at said input terminal,
   a feedback network having its input coupled to said two-state device output and its output coupled to an input of said combining means for providing said feedback signal,
   said feedback means including means responsive to the signal on said two-state device output for providing said feedback signal with a period corresponding to that on the latter output and with amplitude a function of time arranged for algebraic combination with that on said input terminal to produce switching of said two-state device in response to and after each change in level on said two-state device output to control the ratio of time in said second output level to time in said first output level in accordance with the level on said input terminal,
   said feedback network including an integrating circuit for converting a signal of generally rectangular waveform on said two-state device output into a waveform comprising exponentially rising segments alternating with exponentially falling segments,
   said two-state device comprising first and second semiconductor switching devices,
   an output terminal coupled to both said semiconductor switching devices for receiving current from the conductive one,
   and means responsive to said combined signal for rendering said first and said second semiconductor switching devices alternately conductive during mutually exclusive alternating time intervals.

6. Signal translation apparatus in accordance with claim 5 wherein
   said means responsive to said combined signal comprises a Schmitt trigger circuit.

7. Signal translation apparatus in accordance with claim 6 wherein
   said first and second output semiconductor switching devices form a complementary pair of transistors,
   and means for delivering a signal from the output of said Schmitt trigger circuit to both said transistors to render one conductive and the other nonconductive.

8. Signal translation apparatus comprising,
an output terminal,
sources of first and second output signal levels,
a switching signal terminal,
switching means for alternately coupling said first and said second output signal levels to said output terminal in response to a predetermined shift in the level of a switching signal on said switching signal terminal,
an input terminal for receiving an input signal,
combining means for providing said switching signal by combining the signal on said input terminal with a feedback signal,
feedback means coupling said output terminal to said combining means and providing said feedback signal with cyclical variations synchronously related to those of the signal on said output terminal,
and averaging means coupled to said output terminal for providing a signal related to the ratio of time said first signal level is provided on said output terminal to the time said second signal level is provided on said output terminal.

9. Signal translation apparatus comprising,
an output terminal,
sources of first and second output signal levels,
switching means for coupling a selected one of said first and second output signal levels to said output terminal,
switching control means responsive to interruption in the coupling to said ouput terminal of said selected one of said first and second output signal levels for actuating said switching means to couple the other of said first and second output signal levels to said output terminal,
an input signal terminal,
combining means for combining a signal on said input terminal with a feedback signal related to the signal on said output terminal to provide a combined signal,
feedback means for providing said feedback signal coupling said output terminal to said combining means,
means responsive to said combined signal for initiating said interruption in the coupling to said output terminal of said selected one of said first and second output signal levels,
averaging means for providing a signal representative of the average value of the signal on said output terminal,
and means for coupling said output terminal to said averaging means.

10. Signal translation apparatus in accordance with claim 9 wherein said means for coupling said output terminal to said averaging means includes essentially nondissipative means for blocking spectral components of the energy on said output terminal from said averaging means which spectral components are at least as high as the rate at which cycles of said interruption occurs.

11. Signal translation apparatus in accordance with claim 9 wherein the last-mentioned means for coupling comprises energy storage means for transferring many times more energy from said output terminal to said averaging means than said energy storage means dissipates.

12. Signal translation apparatus in accordance with claim 11 wherein said energy storage means comprises an inductor.

13. Signal translation apparatus in accordance with claim 12 wherein said switching means comprises at least one semiconductor switching device.

14. Signal translation apparatus in accordance with claim 13 wherein said switching means comprises a second semiconductor switching device,
said first and second signal levels are potentials of opposite polarity with respect to a reference potential on a common terminal,
said common terminal,
a source energizable to provide said last-mentioned potentials,
and biasing means for establishing only three modes of said switching means, the first mode being said first semiconductor switching device conducting and said second semiconductor switching device nonconducting, the second mode being both said semiconductor switching devices nonconducting and the third mode being said second semiconductor switching device conducting and said first semiconductor switching device nonconducting while preventing the establishment of a fourth mode with both said semiconductor switching devices conducting.

15. Signal translation apparatus in accordance with claim 11 wherein said switching means comprises a first semiconductor switching device and a second semiconductor switching device,
said first and second signal levels are potentials of opposite polarity with respect to a reference potential on a common terminal,
said common terminal,
a source energizable to provide said last-mentioned potentials,
biasing means for establishing only three modes of said switching means, the first mode being said first semiconductor switching device conducting and said second semiconductor switching device nonconducting, the second mode being both said semiconductor switching devices nonconducting and the third mode being said second semiconductor switching device conducting and said first semiconductor switching device nonconducting while preventing the establishment of a fourth mode with both said semiconductor switching devices conducting,
said energy storage means establishing said second mode as dynamically unstable so that said first mode and said third mode are the only stable modes of said switchng means.

16. Signal translation apparatus in accordance with claim 15 wherein said energy storage means comprises an inductor.

17. Signal translation apparatus in accordance with claim 11 wherein said means for coupling presents a nondissipative load to spectral components of energy on said output terminal of a frequency at least equal to the rate of cycles of said switching means.

18. Signal translation apparatus in accordance with claim 17 and further comprising,
second feedback means for coupling the output of said avering means to said combining means and providing a second feedback signal so that said combined signal is related to the signal on said input terminal and both said feedback signals.

19. Signal translation apparatus in accordance with claim 11 and further comprising,
second feedback means for coupling the output of said averaging means to said combining means and providing a second feedback signal so that said combined signal is related to the signal on said input terminal and both said feedback signals.

20. Signal translation apparatus in accordance with claim 13 and further comprising,
a source of a stable fixed potential coupled to said input terminal,
and second feedback means for coupling the output of said averaging means to said combining means and providing a second feedback signal so that said combined signal is related to the signal on said input terminal and both said feedback signals to lessen the difference in potential between said input terminal and said output terminal.

21. Signal translation apparatus in accordance with claim 20 wherein said switching means further comprises a unilaterally conducting device and means for rendering said semiconductor switching device and said unilaterally conducting device alternately conductive during mutually exclusive substantially contiguous time intervals.

22. Signal translation apparatus in accordance with claim 13 wherein said switching means further comprises a second semiconductor switching device,
and first and second oppositely poled unilaterally conducting devices connected across said one and second semiconductor switching devices respectively each rendered conductive in a respective short time interval in response to a respective polarity impulse developed across said inductor in response to said interruption.

23. Signal translation apparatus in accordance with claim 13 wherein said switching means comprises a second semiconductor switching device with one of said semiconductor switching devices PNP and the other NPN,
said first and second signal levels are potentials of opposite polarity with respect to a reference potential on a common terminal,
said common terminal,
a source energizable to provide said last-mentioned potentials,
and biasing means for establishing only three modes of said switching means, the first mode being said first semiconductor switching device conducting and said second semiconductor switching device nonconducting, the second mode being both said semiconductor switching devices nonconducting and the third mode being said second semiconductor switching device conducting and said first semiconductor switching device nonconducting while preventing the establishment of a fourth mode with both said transistors conducting.

24. Signal translation apparatus in accordance with claim 23 wherein said biasing means comprises means for normally initially establishing said first mode upon energization of said energizable source.

25. Signal translation apparatus in accordance with claim 9 wherein said means for coupling said averaging means to said output terminal comprises,
a magnetic recorder.

26. Signal translation apparatus in accordance with claim 25 wherein said means for coupling further comprises,
means for coupling said output terminal to said magnetic recorder to cause a change in the magnetic flux state of the magnetic recorder recording medium upon each of said interruptions,
a reproducing bistable device,
means responsive to each said change in the magnetic flux state for causing a corresponding change in the output level of said reproducing bistable device,
and means for coupling the output level of said reproducing bistable device to said averaging means.

27. Signal translation apparatus comprising,
a two-state device having an input and an output for providing one of first and second output levels and shifting to the other only in response to a predetermined shift in the level on said input to define a product of the magnitude of said predetermined shift and the magnitude of the difference between said first and second output levels,
an input terminal for receiving an external signal,
means for combining a feedback signal related to the signal on said output with the signal applied to said input terminal to provide a combined signal at the combining means output,
means for coupling the output of said combining means to said input to shift said two-state device output between said first and second levels whereby the signal at said output includes a characteristic representative of the signal at said input terminal,
and means responsive to a signal present in said apparatus for controlling at least one of the magnitudes defining said product.

28. Signal translation apparatus in accordance with claim 27 wherein said output signal characteristic is its average value over a cycle and further comprising,
averaging means,
and means for coupling said bistable device output to said averaging means to provide a signal having a waveform corresponding substantially to the signal then received by said input terminal.

29. Signal translation apparatus in accordance with claim 27 wherein said at least one of the magnitudes is the magnitude of said predetermined shift.

30. Signal translation apparatus comprising,
a two-state device having an input and an output for providing one of first and second output levels and shifting to the other only in response to a predetermined shift in the level on said input,
an input terminal for receiving an external signal,
means for combining a feedback signal related to the signal on said output with the signal applied to said input terminal to provide a combined signal at the combining means output,
means for coupling the output of said combining means to said input to shift said two-state device output between said first and second levels whereby the signal at said output includes a characteristic representative of the signal at said input terminal,
a feedback network having its input coupled to said two-state device output and its output coupled to an input of said combining means for providing said feedback signal,
said feedback means including means responsive to the signal on said two-state device output for providing said feedback signal with a period corresponding to that on the latter output and with amplitude as a function of time arranged for algebraic combination with that on said input terminal to produce switching of said two-state device in response to and after each change in level on said two-state device output to control the ratio of time in said second output level to time in said first output level in accordance with the level on said input terminal,
said feedback network including an integrating circuit for converting a signal of generally rectangular waveform on said two-state device output into a waveform comprising exponentially rising segments alternating with exponentially falling segments and further including delay means so that the start of one of said segments occurs at a time interval following a prior change in the two-state device output signal level which time interval corresponds to the delay furnished by said delay means.

31. Signal translation apparatus comprising,
an output terminal,
sources of first and second output signal levels,
a switching signal terminal,
switching means for alternately coupling said first and said second output signal levels to said output terminal in response to a predetermined shift in the level of a switching signal on said switching signal terminal,
an input terminal for receiving an information-bearing input signal,
combining means for providing said switching signal by combining the signal on said input terminal with a feedback signal,
feedback means coupling said output terminal to said combining means and providing said feedback signal with cyclical variations synchronously related to those of the signal on said output terminal, and detecting means responsive to the signal on said output terminal for providing a signal waveform corresponding to the waveform of the information carried by an input signal then on said input terminal.

32. Signal translation apparatus comprising, an output terminal, sources of first and second output signal levels, first switching means for selectively coupling said first output signal level to said output terminal, second switching means for selectively coupling said second output level to said output terminal, and switching control means responsive only to interruption in the coupling to said output termnal of the one of said first and second output signal levels coupled to said output terminal immediately before said interruption for actuating that one of said switching means which couples the other of said first and second output signal levels to said output terminal to couple said other of said first and second output signal levels to said output terminal immediately following said interruption, said switching control means including means for establishing an OFF-OFF mode during the short time interval when each interruption occurs in which mode both said first switching means and said second switching means block the flow of signals therethrough to said output terminal.

33. Signal translation apparatus in accordance with claim 32 wherein said first switching means comprises a first semiconductor switching device and said second switching means comprises a second semiconductor switching device and further comprising, energy storage means for selectively rendering the conducting one of said first and second semiconductor switching devices nonconductive.

34. Signal translation apparatus in accordance with claim 32 and further comprising, first and second switch-off terminals, means for coupling said first switch-off terminal to said first switching means for only opening said switching means in response to a signal on said first switch-off terminal, and means for coupling said second switch-off terminal to said second switching means to only open said switching means in response to a signal on said second switch-off terminal.

References Cited by the Examiner
UNITED STATES PATENTS

| | | | |
|---|---|---|---|
| 2,864,961 | 12/1958 | Lohman et al. | 307—88.5 |
| 3,092,729 | 6/1963 | Cray | 307—88.5 |
| 3,150,272 | 9/1964 | Gard | 307—88.5 |
| 3,192,403 | 6/1965 | Bernfeld et al. | 307—88.5 |

OTHER REFERENCES

Pub. I "A Direct Current Switching Amplifier" by Eadon Smith in Electronic Engineering, dated July 1962, pp. 472–475 are pertinent.

ARTHUR GAUSS, *Primary Examiner.*

S. D. MILLER, *Assistant Examiner.*

Disclaimer

3,294,981.—*Amar G. Bose*, Chestnut Hill, Mass. SIGNAL TRANSLATION EMPLOYING TWO-STATE TECHNIQUES. Patent dated Dec. 27, 1966. Disclaimer filed Feb. 6, 1976, by the assignee, *Bose Corporation*.

Hereby enters this disclaimer to claims 5-9 and 30 of said patent.

[*Official Gazette March 30, 1976.*]